J. L. WENTZ.
BELT CONVEYER.
APPLICATION FILED NOV. 5, 1917.
1,266,363. Patented May 14, 1918.
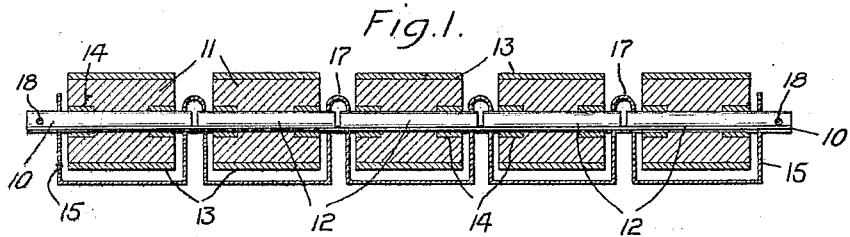
Fig. 1.
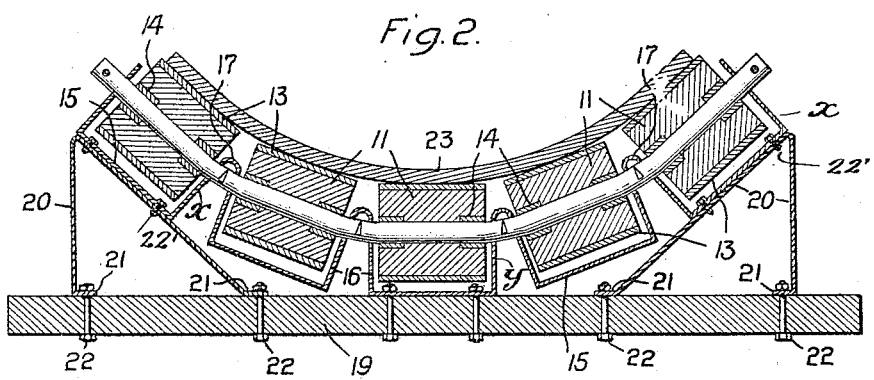
Fig. 2.
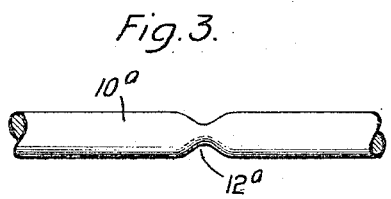
Fig. 3.
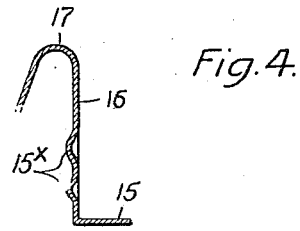
Fig. 4.
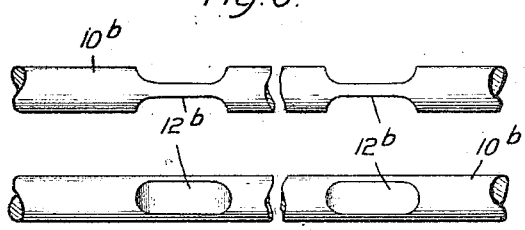
Fig. 5.
Fig. 6.
WITNESS
Jere L. Wentz
INVENTOR.
BY
his ATTORNEY

UNITED STATES PATENT OFFICE.

JERE L. WENTZ, OF PASSAIC, NEW JERSEY.

BELT CONVEYER.

1,266,363.  Specification of Letters Patent. Patented May 14, 1918.

Application filed November 5, 1917. Serial No. 200,232.

*To all whom it may concern:*

Be it known that I, JERE L. WENTZ, a citizen of the United States of America, residing at Passaic, county of Passaic, State of New Jersey, have invented certain new and useful Improvements in Belt Conveyers, of which the following is a specification.

My invention relates to belt conveyers of the type in which the belt passes over rollers or idlers which are angularly disposed so as to impart a cup or trough shape to the belt for the purpose of preventing lateral escape of material therefrom.

The primary object of the invention is to provide a belt conveyer structure in which the idlers are flexibly supported for the purpose of minimizing wear on the belt. These belt conveyers frequently transport heavy angular pieces of highly abrasive material and if the idlers are supported on rigid shafts as they commonly are in practice, each such particle of material resting on the belt where the latter is supported by the idler tends to abrade the belt, so that after a relatively short period of use the face of the belt which is usually of rubber becomes very substantially worn. By flexibly or yieldingly supporting the idlers I overcome the tendency of the material to abrade the belt and thus greatly increase the life of the latter.

A further object is to greatly simplify and cheapen the structure of belt conveyer apparatus, the latter purpose being accomplished primarily by the use of a single shaft upon which the idlers are mounted and of a single integral bracket for supporting the shaft.

The invention is illustratively exemplified in the accompanying drawing, wherein—

Figure 1 is an elevational view of the shaft supporting bracket and shaft, the idlers being shown on the shaft in section, and the structure appearing in horizontal position;

Fig. 2 is a similar view of the structure of Fig. 1 in operative position;

Fig. 3 is a fragmentary view of a modified form of shaft for supporting the idlers;

Fig. 4 is a plan view of a fragment of the supporting bracket at an angular part thereof; and Fig. 5 is an elevational view, and Fig. 6 a plan view, of a still further modified form of supporting shaft for the idlers.

In carrying my invention into practice, I provide a single shaft 10 for a series of any desired number of idlers 11. The shaft which may be hollow or solid is attenuated at intervals so as to enable it to be bent angularly at such points. In the form of Fig. 1 the attenuated portions 12 are produced by simply cutting or sawing the shaft partly through, and in Fig. 3 the attenuated portions which enable the shaft $10^a$ to be bent consist of circumferential diameter reductions or constrictions $12^a$. In Figs. 5 and 6 the attenuations are formed by reducing or depressing the shaft $10^b$ as at $12^b$, at diametrically opposite sides of the axis.

Each idler 11 is preferably made of wood and may have a rubber facing 13. It is also provided with oppositely disposed inset friction-reducing bearings 14 to engage the shaft 10. Separate end bearings 14 as shown in Fig. 1 are preferable, although a single through bearing sleeve may be provided if desired. The shaft with its superimposed idlers is supported by a specially formed bracket 15 constituting one of the features of my invention. This bracket may be made of a piece or blank of flat more or less springy metal of suitable width, and is bent up to form the terminal supporting arms 16 and the intermediate strengthening loops 17, one of the latter being between each pair of adjacent idlers 11. The opposite ends of the shaft 10 pass through suitable openings in the upwardly bent terminal arms 16 and are removably retained in position by means of the cotter pins 18. Adjacent the angular bends the material of the bracket may be struck up, as at $15^x$, for strengthening purposes.

As shown in Fig. 1 the entire structure so far described and comprising the bracket 15, shaft 10, and the idlers 11, may be assembled in horizontal position, which is of great convenience in manufacture.

To support the idler structure upon any suitable surface such as a board or plank 19, I preferably employ angular supporting brackets 20, each foot of which has a projecting flange 21 by means of which the bracket as a whole is bolted to the plank 19 by the bolts 22.

The inclined arm of the bracket 20 forms the support to which one of the end sections denoted $x$ of the bracket 15 is secured by bolts 22'. The central section, denoted y, of the bracket 15, is preferably secured to the plank 19 by bolts 22. The brackets 20 may be of any desired angularity, that is the inner leg of each such bracket may be inclined to any desired pitch, whereby suitable angular arrangement of the idlers 11 is secured, and consequently any desired degree of troughing of the belt 23 is effected. A bracket 20 is provided as a support at each end of the idler structure.

The device may be readily assembled and disassembled even by an unskilled workman. To assemble the device the supporting bracket 15 is first placed in position, the idlers being arranged between the loops of the bracket, and thereafter the shaft 10 is passed or what may be termed "threaded" through the idlers, and then the cotter pins 18 are inserted at the ends of the shaft 10. The supporting brackets 20 having been bolted to the plank 19, the idler structure of Fig. 1 is attached to the brackets 20, with the center portion of the bracket 15 bolted to the plank 19, and the device is ready for use. After the one piece shaft 10 has been bent and placed in position on the supporting bracket, such shaft cannot revolve, which is a distinct advantage in this type of structure. To disassemble the structure the supporting bracket 15 is released from the brackets 20 and from the plank 19, thereafter is lifted to the ground, and the cotter pins 18 removed and the shaft 10 may then be withdrawn from the idlers and from the bracket 15.

When a device of this character is in operation, that is when the belt 23 is passing over the idlers 11 and revolving the latter, the load will be carried along by the belt as usual, and if the load consists of separate pieces of material, as is frequently the case, the individual pieces as they pass over the idlers will have a tendency to depress the latter, and such idlers will yield to a slight extent, thus preventing any appreciable abrasion or wear of the belt, and in this manner the life of the belt is substantially increased.

What I claim as new and desire to secure by Letters Patent is:—

1. In belt conveyers, the combination with a shaft having bends therein at intervals, of idlers on the shaft between the bends thereof, an integral bracket of yielding material for supporting said shaft, a support to which an intermediate part of said bracket is attached, and means for supporting the opposite ends of the bracket in elevated position, whereby portions of the bracket between its middle part and its ends are unsupported.

2. In belt conveyers, the combination with a shaft having bends therein at intervals, of idlers on the shaft between the bends thereof, an integral shaft-supporting bracket of yielding material comprising alternately plane and projecting portions, a support to which the middle plane portion of the bracket is secured, and elevated supports to which the opposite plane end portions of the bracket are secured, whereby portions of the bracket between its middle part and its ends are unsupported.

3. In belt conveyers, the combination with an integral shaft attenuated at intervals and having bends at such attenuated parts, of idlers on the shaft between the bends thereof, an integral spring metal shaft-supporting bracket comprising alternately plane and projecting portions, a support to which the middle plane portion of the bracket is secured, and upstanding angular brackets on said support and to which the opposite plane end portions of the first named bracket are secured, whereby portions of said first named bracket between its middle part and its ends are unsupported.

In testimony whereof I have affixed my signature in presence of two witnesses.

JERE L. WENTZ.

Witnesses:
CLARICE FRANCK,
BERTHA MUELLER.